United States Patent [19]

LaGess

[11] Patent Number: 5,046,063

[45] Date of Patent: Sep. 3, 1991

[54] METHOD AND APPARATUS FOR ACHIEVING COMMUNICATION AT ALL LOCATIONS ALONG A PING PONG COMMUNICATIONS CHANNEL

[75] Inventor: Eric T. LaGess, Mineral Wells, Tex.

[73] Assignee: Industrial Technology, Inc., Mineral Wells, Tex.

[21] Appl. No.: 479,114

[22] Filed: Feb. 13, 1990

[51] Int. Cl.⁵ .......................................... H04L 5/14
[52] U.S. Cl. ...................................... 370/29; 370/24; 370/77
[58] Field of Search ...................... 370/29, 24, 31, 32, 370/77

[56] References Cited

U.S. PATENT DOCUMENTS

| | | | |
|---|---|---|---|
| 3,967,058 | 6/1976 | Moriya et al. | 370/29 |
| 4,049,908 | 9/1977 | Knorpp et al. | 370/77 |
| 4,404,672 | 9/1983 | Shimizu | 370/29 |
| 4,484,028 | 11/1984 | Kelley et al. | 370/29 |
| 4,644,524 | 2/1987 | Emery | 370/29 |
| 4,653,044 | 3/1987 | Kudo | 370/29 |
| 4,679,188 | 7/1987 | Fukuda et al. | 370/29 |
| 4,720,827 | 1/1988 | Kanaji | 370/29 |

FOREIGN PATENT DOCUMENTS

| | | | |
|---|---|---|---|
| 0137225 | 4/1985 | European Pat. Off. | 370/29 |
| 0163744 | 7/1986 | Japan | 370/29 |

Primary Examiner—Benedict V. Safourek
Assistant Examiner—Alpus H. Hsu
Attorney, Agent, or Firm—Geoffrey A. Mantooth; James C. Fails

[57] ABSTRACT

There is provided a master station for transmitting data bursts at predetermined periods of time. A slave station receives the master station data bursts and transmits a replying data burst upon the receipt of each master station data burst. The transmissions of the data bursts from the master and slave stations are interleaved so that there may be data bursts transmitted by both stations on the channel at the same times. The data bursts are interleaved so that the master station receives the slave station's data bursts between transmissions of data bursts by the master station.

5 Claims, 2 Drawing Sheets

METHOD AND APPARATUS FOR ACHIEVING COMMUNICATION AT ALL LOCATIONS ALONG A PING PONG COMMUNICATIONS CHANNEL

FIELD OF THE INVENTION

The present invention is related to communication methods and apparatuses, and in particular to communication methods and apparatuses utilizing ping pong or burst methods.

BACKGROUND OF THE INVENTION

Ping pong communication methods, which are well known in the prior art, are used to provide full duplex communications over a communications channel, which channel requires amplification. Full duplex allows each station that is on the communications channel to transmit and receive with apparent simultaneity. For example, an ordinary telephone is duplexed; a user can talk and listen at the same time.

With ping pong methods, only one communications channel is required. This channel may be a light fiber, a radio link or a multiplexed telephone pair. The ping pong method converts the data to be transmitted into digital data by sampling. Sampling is done at a frequency that is much higher than the Nyquist frequency of the sampled data. The sample data is then transmitted over the communications channel in bursts.

Some prior art methods operate in the following manner: a first station transmits a data burst on the channel, which is received by a second station. Upon receipt of the data burst, the second station transmits its own data burst, which is received by the first station. Upon receipt of the second station's data burst, the first station transmits another data burst, and so on. Thus, the stations take turns transmitting and receiving so that data bursts are transmitted in a ping pong fashion. This transmitting arrangement is ineffective at long ranges (over 10 kilometers). The transmitted data bursts suffer a propagation delay, which is the time of travel between the two stations. At long ranges, the propagation delay is significantly long, slowing the transmission rate to unacceptable levels.

Another prior art ping pong method transmits large bursts of data in order to compress the effective transmission rate. Each large burst is made up of several single data bursts. Unfortunately, this prior art approach is difficult and expensive to implement.

One way to achieve ping pong communication at long ranges in a simple and economical manner is to provide a master station and a slave station as the first and second stations. The master stations transmits single data bursts at fixed intervals of time. The slave station only transmits upon receipt of a master station data burst.

When the distance between stations is such that the propagation delay results in data from the slave station arriving at the master station while the master station is transmitting, the data is lost. Thus, the slave station is located in a type of "dead zone" along the communications channel, wherein communication with the master station is unobtainable.

Service personnel frequently encounter this problem when tapping into a channel to communicate, for example, with a central station. When tapping into the channel with a test set, they may tap into a "dead zone", wherein communication with the central station is unachievable. It may be inconvenient or impossible to move to another location that is along the communications channel to relocate the tap out of the dead zone. What is needed is a simple and economical approach to provide communication at all locations along a ping pong communications channel.

SUMMARY OF THE INVENTION

It is an object of the present invention to provide a method and apparatus that will allow communications at all locations along a ping pong communications channel.

The method of the present invention is able to achieve communication at all locations along a ping pong communications channel that has first and second stations thereon. The first station transmits data bursts onto the channel at predetermined intervals of time. The second station receives the first station data bursts. The second station transmits data bursts on the channel upon the receipt of the first station data bursts. The transmissions of the data bursts by the first and second stations are interleaved by controlling the transmission rate of either the first station or the second station so that the first station will receive the second station data bursts between the transmissions of the first station data bursts.

By interleaving the transmissions of the first and second stations, the effective transmission rate of the system can be increased to satisfactory levels, even at long ranges. Interleaving the transmission of the first and second stations allows both stations to transmits data bursts onto the channel so that the channel can have two data bursts coming from opposite ends propagating in opposite directions at the same time. By controlling the interleaving so that the first station will receive the second station data bursts between transmissions of the first station data bursts, communication can be established. Control is achieved by either controlling the response time of the second, or slave, station after receipt of a first station data burst or by controlling the transmission rate of the first, or master, station.

In one aspect, the method of the present invention begins by initiating communication by transmitting a first signal over the channel with a first station. The first signal is received by a second station. The second station transmits a second signal over the channel after a first elapsed time from the reception of the first signal. The second station receives subsequent first station signals. The subsequent first station signals are transmitted by the first station subsequent to the transmission of the first signal. The subsequent first station signals indicate whether communication between the first and second stations has been established. The second station transmits subsequent second station signals, with each of these subsequent second station signals being transmitted after a first elapsed time in response to the reception of a respective subsequent first station signal. The subsequent first station signals are examined at the second station to determine if communication has been established. If communication has not been established, then each of the subsequent second station signals are transmitted after a second elapsed time from the reception of the respective subsequent first station signals.

In another aspect, the apparatus of the present invention includes transceiver means, call signal generator means, first and second switch means, delay means and call signal detector means. The transceiver means transmits and receives signals, such as data bursts over the channel. The transceiver means has a trigger input for triggering the transmission of a data burst. The call signal generator means generates call signals and is connected with the transceiver means to provide for the transmission of the call signals over the channel. The first switch means is for switching between a master state and a slave state. The first switch means is connected to the trigger input, wherein when the first switch means is in the master state, the trigger input is connected with a clock means so that the transceiver means transmits data bursts at periodic intervals of time. When the first switch means is in the slave state the trigger input is connected with a trigger means for triggering the transmission of a data burst after the reception of a data burst from said channel. The second switch means switches between plural delay states and is connected with the trigger means and the slave state of the first switch means so that the second switch means connects plural delay states with the trigger means and the trigger input. The delay means provides a time delay. The delay means is connected with the second switch means such that when the second switch means is in one of the delay states, the trigger means is connected to the trigger input through the delay means. The call signal detector means detects the reception of call signals over a predetermined period of time. The call signal detector means switches the second switch means if call signals are received from the channel for a predetermined period of time.

The apparatus and method of the present invention allow communications between first and second stations along a communications channel, regardless of their locations. Because of propagation times of the signals over the channel, an incoming signal may arrive at the first station at the same it is transmitting, resulting in failure to receive the incoming signal. With the apparatus and method of the present invention, this situation is avoided by changing the response time of the second station. The response time is either increased or decreased to control the arrival time of the incoming signal to the first station. By controlling the response time of the second station, communication can be achieved at all locations along a communications channel. Alternatively, the situation is avoided by controlling the transmission rate of the master station to cause the slave station's signal to arrive between master station transmissions.

DESCRIPTION OF PREFERRED EMBODIMENT

Figure 1:
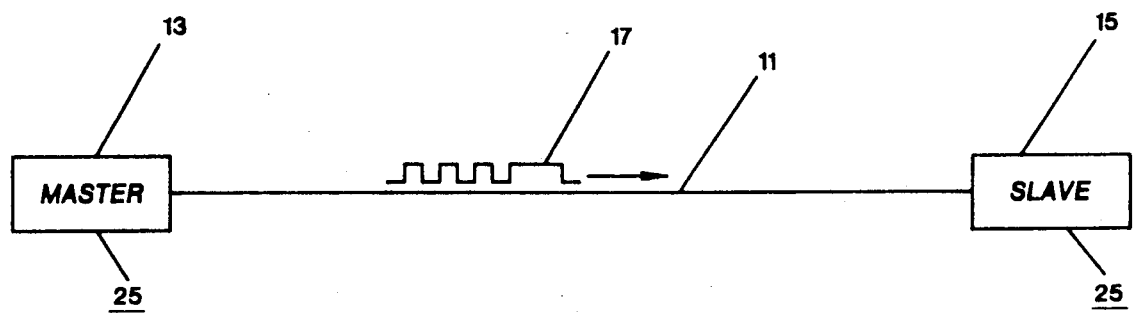
FIGS. 1-5 are block diagrams of a communications channel, showing the basic principles of ping pong methods.
Figure 2:
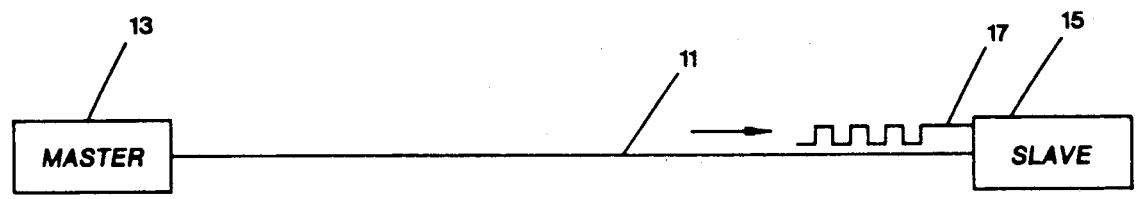
Figure 3:
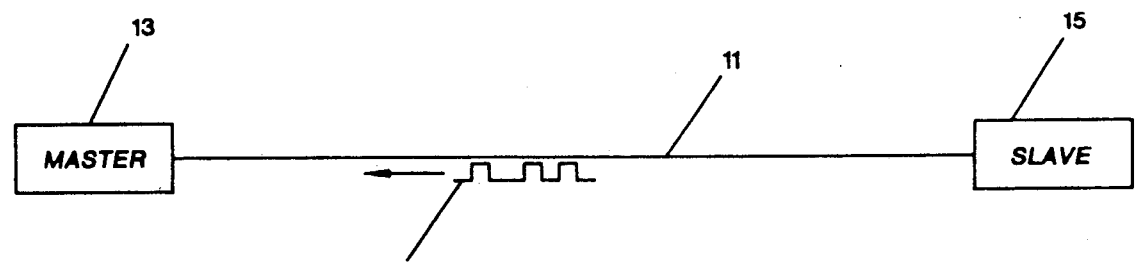
Figure 4:
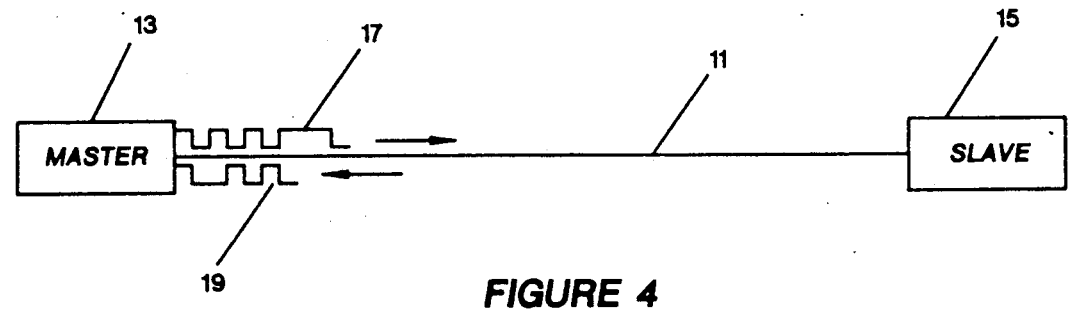

Ping pong, or burst mode, communication methods are commonly used in the telephone industry to provide duplex communications along a single fiber optic channel 11. As shown in FIGS. 1-4, there is provided a master station 13 and a slave station 15. The master station 13 initiates communication by transmitting call pulses 17 (see FIG. 1). The master station transmits both bursts of data and the call pulses at fixed intervals of time. The slave station 15 receives the call pulses 17 and data bursts from the master station (see FIG. 2); after each data burst from the master station that is received, the slave station transmits a data burst 19 to the master station (see FIG. 3). The master station 13 listens for the data burst 19 from the slave station 15 between its own transmissions.

If the master station 13 is transmitting when the signal 19 from the slave station 15 arrives (see FIG. 4), then the slave station signal will be lost to the master station. This timing coincidence between the transmission by the master station and the arrival of the slave's data burst prevents the establishment of communications between the stations.

The time of arrival of the slave station signal 19 at the master station 13 is determined by the propagation delay of the signal and by the time of transmission by the slave station, relative to the time of transmission by the master station. The propagation delay of a signal is the time of travel between stations along the channel. The farther apart the two stations are, the longer the propagation delay. The time of transmission by the slave station is determined by the reception of a master station signal by the slave station. In the prior art, the slave station transmits immediately after receiving the master station signal.

Figure 5:
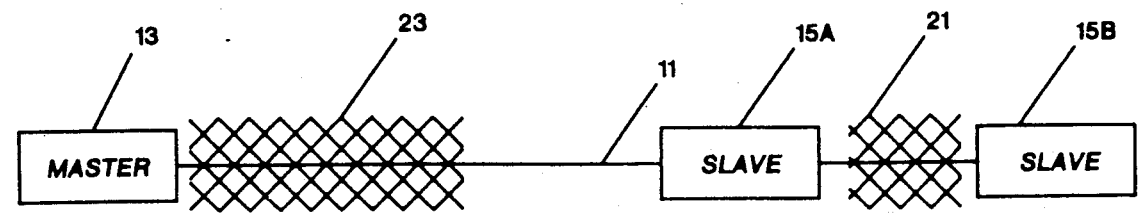

The inability to establish communications occurs when the slave station 15 is located within certain "dead zones" (see FIG. 5) along the length of the channel, relative to the position of the master station 13. One such dead zone 21 is located at a distance from the master station 13 such that the data bursts from the slave station arrive at the master station electro-optic transmitter/receiver while it is transmitting. This type of zone 21 typically occurs at periodic intervals along the length of the channel. Another type of dead zone 23 occurs at short distances from the master station, wherein the data bursts from the slave station arrive at the master station while the light element is recovering from transmitting and thus is unable to receive.

The apparatus and method of the present invention avoids such simultaneous transmitting and receiving by the master station, thereby allowing communications. First, it is determined if there exists such a timing coincidence at the master station. If there is a timing coincidence, then the time of transmission by the slave station relative to the reception of the signal from the master station is adjusted. By adjusting the slave station's time of transmission, simultaneous transmission and reception by the master station is avoided.

Figure 6:
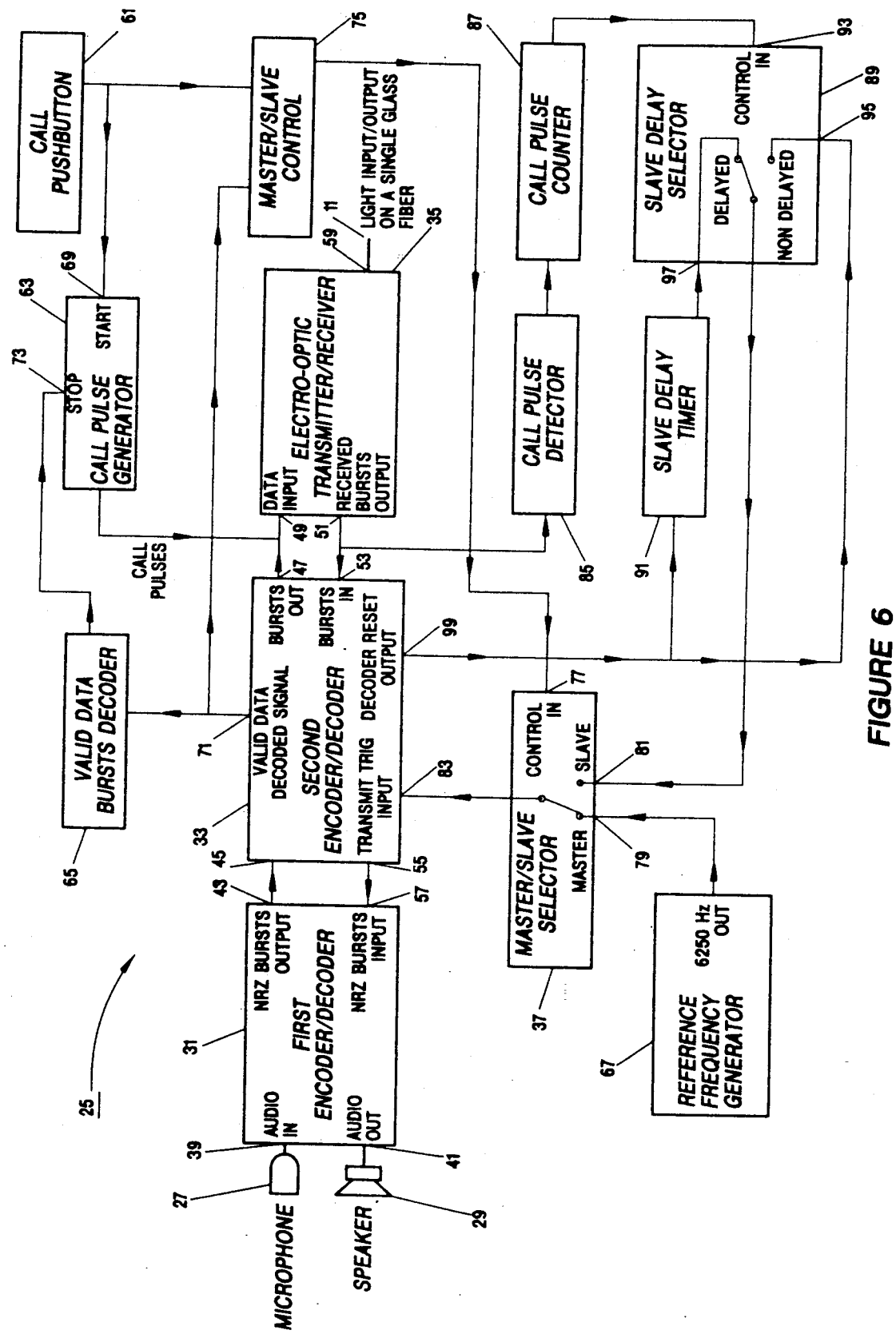
FIG. 6 is a block diagram of the apparatus of the present invention, in accordance with a preferred embodiment.

In FIG. 6, there is shown a block diagram of the apparatus 25 of the present invention, in accordance with a preferred embodiment. In the present invention, the apparatus is a telephone set for use on a fiber optic channel 11 by test personnel. Although the preferred embodiment is described in junction with a fiber optic channel, the present invention can be used with other types of communications channels such as a radio channel or a multiplexed telephone conductor pair. Two apparatuses 13, 15 are connected to the same communications channel 11, with each apparatus being a station on the channel.

The apparatus 25 includes a microphone 27 and a speaker 29, first and second encoders/decoders 31, 33, an electro-optic transmitter/receiver 35, master station components, slave station components, and a master/slave selector 37. The apparatus 25 has master station and slave station components that allow it to become either a master station or a slave station. Whether or not a particular apparatus is a master station or a slave station depends on whether that apparatus initiates a call.

When a call is initiated from a first apparatus, that apparatus becomes a master station. When a call is initiated from a second apparatus, the first apparatus becomes slaved to the second apparatus, and the second apparatus is a master station.

The first encoder/decoder 31 codes between audio signals and digital signals. The microphone 27 is connected to the audio input 39 of the first encoder/decoder 31, while the speaker 29 is connected to the audio output 41. The first encoder/decoder 31 converts the audio signal from the microphone 27 to a digital 8 bit word. Specifically, NRZ (nonreturn-to-zero) coding is utilized in the preferred embodiment, although other types of coding may also be utilized. Conversely, the digital word is converted to an audio output for the speaker 29. The first encoder/decoder 31 is connected to the second encoder/decoder 33, which further encodes (and decodes) the NRZ digital signals. The NRZ output 43 of the first encoder/decoder 31 is connected to the NRZ input 45 of the second encoder/decoder 33. The second encoder/decoder 33 produces a pulse coded modulation (PCM) signal at its PCM output 47, which is connected to the data input 49 of the electro-optic transmitter/receiver 35. The data output 51 of the electro-optic transmitter/receiver 35 is connected to the PCM input 53 of the second encoder/decoder 33. The PCM signal is converted back into the NRZ format used by the first encoder/decoder. The NRZ output 55 of the second encoder/decoder 33 is connected to the NRZ input 57 of the first encoder/decoder 31.

The electro-optic transmitter/receiver 35 converts between electrical signals and optical signals. The optical port 59 of the electro-optic transmitter/receiver is connected to the optical fiber 11. The electro-optic transmitter/receiver 35 has a light element (not shown), which acts as both a light transmitter and a light receiver. The light element is a light emitting diode (LED).

The master station components include a call button 61, a call pulse generator 63, a valid data detector 65, and a reference frequency generator 67. The call button 61 is connected to a start input 69 of the call pulse generator 63. The call pulse generator 63 produces call pulses for transmission over the fiber optic channel 11. The output of the call pulse generator 63 is connected to the data input 49 of the electro-optic transmitter/receiver. The input of the valid data detector 65 is connected to a valid data signal output 71 of the second encoder/decoder 33. The output of the valid data detector 65 is connected to the stop input 73 of the call pulse generator 63. The call button 61 is also connected to a master/slave control 75 which is connected to a control input 77 into the master/slave selector 37. The master/slave selector 37 is essentially a single-pole, double-throw switch which is switchable between a master input 79 and a slave input 81. The master input 7 is connected to the output of the reference frequency generator 67. The reference frequency generator 67 produces a stable reference waveform for use in timing the transmission intervals of the apparatus when operating as a master station. The common terminal of the selector 37 is connected to a transmit trigger input 83 of the second encoder/decoder 33.

The slave station components include a call pulse detector 85, a call pulse counter 87, a slave delay selector 89, and a slave delay timer 91. The input of the call pulse detector 85 is connected to the data output 51 of the electro-optic transmitter/receiver 35. The output of the call pulse detector 85 is connected to the input of the call pulse counter 87. The call pulse counter 87 output is connected to the control input 97 of the slave delay selector 89. The slave delay selector 89 is essentially a single-pole, double-throw switch which is switchable between a non-delay input 95 and a delay input 97. The non-delay input 95 is connected to a decoder reset output 99 of the second encoder/decoder 33. The delay input 97 is connected to the output of the slave delay timer 85. The slave delay timer 85 is also connected to the decode reset output 99 of the second encoder/decoder 33. The common terminal of the slave delay selector 89 is connected to the slave input 81 of the master/slave selector 37.

The operation of the present invention will now be described. First, two stations are connected to the fiber optic communications channel 11. Each station includes an apparatus 25 which is connected such that its electro-optic transmitter/receiver 3 is optically coupled to the light fiber 11.

When an operator desires to call the other station, he picks up the handset embodying the microphone 27 and speaker 29 of his apparatus and presses the call button 61. The call button activates the master/slave control 75, which is basically a latch. The master/slave control 75 switches the master/slave selector 37 to the master input 79, thereby switching the calling apparatus 13 to the master mode.

The pressing of the call button 61 also starts the call pulse generator 63, wherein long call pulses are produced at fixed intervals of time. The call pulses are transmitted over the light fiber 11 by the electro-optic transmitter/receiver 35.

The call pulses are mixed in with data bursts from the second encoder/decoder 33. Once the apparatus enters the master mode, the reference frequency generator 67 is connected to the transmit trigger input 83 of the second encoder/decoder 33. This triggers the second encoder/decoder 33 to produce bursts of data outputted to the electro-optic transmitter/receiver 35 at periodic or fixed intervals of time, irregardless of the presence or absence of audio data. Thus, the call pulses are mixed in with the data bursts during the initial transmissions. In the preferred embodiment, the call pulses are 60 microseconds long and occur every 9 milliseconds, while the data bursts are 22 microseconds long and occur every 160 microseconds.

Call pulses continue to be produced until valid data is received from the slave station 15. While the electro-optic transmitter/receiver 35 is transmitting, data cannot be received from the slave station. Between transmissions, data is received by the electro-optic transmitter/receiver 35, which sends it to the second encoder/decoder 33. For every data burst, the valid data output 71 of the second encoder/decoder produces a pulse. The valid data burst detector 65 averages out these pulses to determine if data bursts are actually being sent from the slave station. If valid data bursts are detected, then the valid data detector 65 stops the call pulse generator 63 from producing call pulses, wherein data bursts from the master station second encoder/decoder 33 continue to be sent at fixed intervals of time.

Turning now to the station 15 which is being called by the master station 13, this other station receives data bursts via its electro-optic transmitter/receiver 35. The data bursts are sent to the second encoder/decoder 33, which produces output signals from the valid data decoder signal output 71. The signals from the output 71 set the master/slave control 75, which latches the apparatus into the slave mode by switching the master/slave selector 37 to the slave input 81.

The slave station 15 transmits only in response to a received signal from the master station 13. When a data burst is received from the light fiber 11, the decoder reset output 99 of the second encode/decoder 33 produces an output. The slave delay selector 89, which, for example, is in the non-delay mode, passes this output to the transmit trigger input 83 of the second encoder/decoder via the master/slave selector 37, wherein the second encoder/decoder 33 is triggered to produce a data burst. Thus, after each reception of a data burst from the master station, the slave station responds with a data burst of its own. Because of circuit switching times, this response by the slave station occurs several microseconds after the end of the reception of the master station data.

Communications between the master and slave stations 13, 15 is established when the master station receives the data bursts from the slave station. The master station then stops producing call pulses, while continuing periodic transmissions of data bursts.

Communications will not be established between the stations if the master station does not receive the data bursts from the slave station. Such a situation arises when the slave station is located in a "dead zone" along the channel 11. With the present invention however, communications can be established, despite the slave station being located in a dead zone. When the slave station 15 receives the signals from the master station 13, it monitors the presence of call pulses in the signals. The slave station realizes that the master station did not receive the slave's data bursts if the master station continues to transmit call pulses. The call pulses are detected by the call pulse detector 85, which filters out the data bursts and produces an output for each call pulse. The individual outputs are counted by the call pulse counter 87. The call pulse counter 87 has two output states. After the call pulse 87 has reached a predetermined number of call pulses, which corresponds to a predetermined length of time, the counter changes states to switch the slave delay selector 89 to the delay mode from the non-delay mode. This connects the decoder reset output 99 of the second encoder/decoder 33 to the slave delay timer 91. The slave delay timer 91 delays by a predetermined amount of time the triggering of the next data burst from the second encoder/decoder 35. The slave delay timer 91 produces an output that triggers the second encoder/decoder trigger input 83.

By switching the slave station to the delay mode, the data bursts are transmitted to the master station after a time delay. The delay is chosen so that the data bursts from the slave station arrive at the master station at a time when the master station electro-optic transmitter/receiver is in a receiving condition. Thus, the slave station is effectively moved out of its dead zone.

The arrival time of each slave station data burst can thus be controlled so that its arrival at the master station occurs when the master station is in a condition to receive. The slave station recognizes that the master station is not receiving its data bursts by the continued reception of call pulses. The slave station, which transmits a data burst after receiving a data burst, changes its transmission response time. By changing the response time, the arrival time can be controlled to avoid the problem of lost data. In the preferred embodiment, the delay is 80 microseconds.

The slave delay selector 89 toggles between the non-delay and delay modes. The selector 89 could, for example, be in the delay mode when call pulses are initially received by the slave station. If the slave station is located in a dead zone, at the delay mode response time, changing to the non-delay mode would subtract delay time, or shorten the response time. This effectively relocates the slave station 15A to a position in front of the dead zone 21 (see FIG. 5). If the selector 89 was in the non-delay mode, and the slave station was in a dead zone, switching to the delay mode would lengthen the response time and effectively relocate the slave station 15B to a position in back of the dead zone.

Once communication with the master station is established, the production of call pulses ceases, wherein the call pulse counter stops counting and the slave delay selector maintains its setting. Thus, once the slave station has found a response time that allows communication with the master station, it maintains that response time.

Although the invention has been described with two response times, namely delay and non-delay, additional response times could be utilized. For example, many discrete delay times could be provided, with the amount of delay increasing or decreasing until communication was established. Also, the delay can be added or subtracted as a continuous variable, until communication was established.

An alternative arrangement can be used to prevent simultaneous transmission and reception by the master station 13. The master station transmits data bursts at fixed intervals of time as described above. Between transmissions, the master station 13 looks for the replying data burst 19 from the slave station 15. If the master station, after a predetermined period of time, does not detect any replying data bursts 19, or only detects portions of the replying data bursts, then the master station adjusts its interval of transmission. The master station begins transmitting data bursts at the new intervals of time, looking for replying data bursts between transmissions. This process is repeated until a complete replying burst is received by the master station, wherein the interval of time between master station transmissions remains fixed. With this arrangement, the slave station 15 transmits immediately upon receipt of a master station data burst. This would correspond to the non-delay mode described above.

The foregoing disclosure and the showings made in the drawings are merely illustrative of the principles of this invention and are not to be interpreted in a limiting sense.

What is claimed is:

1. A method of achieving communication at all locations along a ping pong communications channel having first and second stations, said second station being located at some distance along said channel from said first station, comprising the steps of:
   a) initiating communication by transmitting call signals from said first station over said channel, said first station also transmitting data bursts at periodic intervals of time;
   b) receiving said call signals and said first station data bursts at said second station, and transmitting from said second station a responding data burst after the reception of each first station data burst, each of said responding data bursts being transmitted at a first response time after the reception of said respective first station data burst;

c) continuing the transmission of said call signals by said first station until said first station receives said responding data bursts from said second station, wherein said first station discontinues the transmission of said call signals and communication between said first and second stations is established;

d) continuing to receive transmissions at said second station, and determining at said second station if, after a predetermined period of time, said call signals are continued to be received by said second station, said continued reception of said call signals by said second station after said predetermined period of time indicating that communications between said first and second stations has not been established, and changing the response time of the transmission by said second station of said responding data bursts to a second response time if said second station determines that said call signals continue to be received by said second station after said predetermined period of time.

2. The method of claim 1 wherein said second station changes its response time in transmitting said responding data bursts by either adding or subtracting delay in responding to said received first station data bursts.

3. An apparatus for communicating with ping pong communication methods at all locations along a ping pong communications channel, comprising:

a) transceiver means for transmitting and receiving signals over said channel, said signals comprising data bursts and call signals, said transceiver means being coupled to said channel, said transceiver means transmitting outgoing data bursts over said channel and receiving incoming data bursts from said channel, said transceiver means having a trigger input for triggering the transmission of an outgoing data burst;

b) call signal generator means for generating said call signals to initiate communications over said channel, said call signal generator means being connected with said transceiver means for the transmission of said call signals over said channel;

c) first switch means for switching between a master state and a slave state, said first switch means being connected to said trigger input, wherein when said first switch means is in said master state, said trigger input is connected with a clock means so that said transceiver means transmits outgoing data bursts at periodic intervals of time, and when said first switch means is in said slave state said trigger input is connected with a trigger means for triggering the transmission of an outgoing data burst after the reception of an incoming data burst from said channel;

d) second switch means for switching between delay states, said second switch means being connected with said trigger means and said slave state of said first switch means, wherein said second switch means connects plural delay states with said trigger means and said trigger input;

e) delay means for providing time delay in the transmission of outgoing data bursts by said transceiver means, said delay means being connected with said second switch means such that when said second switch means is in one of said delay states said trigger means is connected to said trigger input through said delay means;

f) call signal detector means for detecting the reception of said call signals over a predetermined period of time, said call signal detector means switching said second switch means if said call signals are received from said channel for said predetermined period of time.

4. The apparatus of claim 3 wherein said second switch means has first and second delay states, with said first delay state connecting said trigger means to said trigger input and with said second delay state connecting said trigger means to said trigger input through said delay means.

5. A system for communicating with ping pong communication methods along a ping pong communications channel, comprising:

a) a first apparatus being adapted to be connected to said channel, said first apparatus comprising:

i) first transceiver means for transmitting and receiving signals over said channel, said signals comprising data bursts and call signals, said first transceiver means being adapted to be coupled to said channel, said first transceiver means transmitting first outgoing data bursts over said channel and receiving first incoming data bursts from said channel when said first transceiver means is coupled to said channel, said first transceiver means having a first trigger input for triggering the transmission of said first outgoing data bursts;

ii) said first apparatus comprising call signal generator means for generating said call signals to initiate communications over said channel, said call signal generator means being connected with said first transceiver means for transmission of said call signals over said channel;

iii) said first apparatus comprising valid data detection means for determining if said first incoming data bursts are received from a second apparatus by said first transceiver means, said valid data detection means being connected with said first transceiver means and being connected with said call signal generator, said valid data detection means causing said call signal generator means to cease generating said call signals when said valid data detection means determines that said first incoming data bursts are being received from said second apparatus;

iv) said first apparatus comprising timing means for providing when said first outgoing data bursts are to be transmitted by said first transceiver means, said timing means being connected to said first trigger input;

b) said second apparatus being adapted to be connected to said channel at some distance from said first transceiver means, said second apparatus comprising:

i) second transceiver means for transmitting and receiving said signals over said channel, said second transceiver means being adapted to be coupled to said channel, said second transceiver means transmitting second outgoing data bursts over said channel when said second transceiver means is coupled to said channel, said second outgoing data bursts being received as said first incoming data bursts by said first transceiver means, said second transceiver means receiving second incoming data bursts when said second transceiver means is coupled to said channel, said second incoming data bursts being transmitted as said first outgoing data bursts by said first transceiver means, said second transmitter means having a second trigger input for triggering the transmission of a second outgoing data burst;

ii) said second apparatus comprising switch means for switching between delay states, said switch means being connected with said second trigger input, wherein said switch means connects plural delay states with a trigger means and said second trigger input, said trigger means for triggering the transmission of a second outgoing data burst after the reception of a second incoming data burst from said channel, said trigger means being connected with said second transceiver means;

iii) said second apparatus comprising delay means for providing time delay in the transmission of data bursts by said second transceiver means, said delay means being connected with said switch means such that when said switch means is in one of said delay states said trigger means is connected to said second trigger input through said delay means.

* * * * *